US012792055B2

(12) United States Patent
Stein

(10) Patent No.: US 12,792,055 B2
(45) Date of Patent: Nov. 10, 2026

(54) AUTONOMOUSLY MOVING TRANSPORT SYSTEM AND A METHOD FOR OPERATING SUCH AN AUTONOMOUSLY MOVING TRANSPORT SYSTEM

(71) Applicant: SICK AG, Waldkirch (DE)

(72) Inventor: Patrick Stein, Bad Krozingen (DE)

(73) Assignee: SICK AG, Waldkirch (DE)

( * ) Notice: Subject to any disclaimer, the term of this patent is extended or adjusted under 35 U.S.C. 154(b) by 23 days.

(21) Appl. No.: 18/989,896

(22) Filed: Dec. 20, 2024

(65) Prior Publication Data

US 2025/0208628 A1 Jun. 26, 2025

(51) Int. Cl.

*G05D 1/633* (2024.01)
*B66F 9/06* (2006.01)
*G05D 105/28* (2024.01)
*G05D 109/10* (2024.01)

(52) U.S. Cl.

CPC .............. *G05D 1/633* (2024.01); *B66F 9/063* (2013.01); *G05D 2105/28* (2024.01); *G05D 2109/10* (2024.01)

(58) Field of Classification Search

CPC ............... G05D 1/633; G05D 2109/10; G05D 2105/28; B66F 9/063
See application file for complete search history.

(56) References Cited

U.S. PATENT DOCUMENTS 10,597,074 B2 3/2020 Stewart et al.
2010/0114416 A1* 5/2010 Au ......................... G05D 1/027 701/23

(Continued)

FOREIGN PATENT DOCUMENTS

DE 102005049159 A1 5/2006
DE 102011077975 A1 12/2012
DE 102011103936 B4 2/2016

(Continued)

OTHER PUBLICATIONS

Communication received from the German Patent and Trademark Office dated Feb. 5, 2025 corresponding to application No. 10 2023 136 270.4.

(Continued)

*Primary Examiner* — Justin S Lee
(74) *Attorney, Agent, or Firm* — Nath, Goldberg & Meyer; Jerald L. Meyer

(57) ABSTRACT

An autonomously moving transport system comprising a control apparatus, an obstacle recognition device and a drive unit, wherein the drive unit is configured to move the autonomously moving transport system along a travel route with a specific travel parameter. The obstacle recognition device is configured to detect an object in a monitored zone and to transmit corresponding object information to the control apparatus. The control apparatus is configured to divide the monitored zone into a travel corridor and at least one first secondary corridor. The control apparatus is configured to determine, based on the object information, whether the detected object is located in the travel corridor or in the at least one first secondary corridor. The control apparatus is configured to adapt a travel parameter differently when the object is in the first secondary corridor than when the object is located in the travel corridor.

18 Claims, 5 Drawing Sheets

(56) References Cited

U.S. PATENT DOCUMENTS

| | | | | |
|---|---|---|---|---|
| 2015/0274165 | A1* | 10/2015 | von Collani | G05D 1/622<br>701/70 |
| 2017/0043767 | A1* | 2/2017 | Khafagy | B60W 30/16 |

FOREIGN PATENT DOCUMENTS

| | | | | | |
|---|---|---|---|---|---|
| DE | 102016108307 | A1 | | 9/2017 | |
| DE | 102017113392 | A1 | | 12/2018 | |
| DE | 102020129552 | A1 | | 5/2022 | |
| EP | 3587894 | A1 | | 1/2020 | |
| EP | 4047257 | A1 | | 8/2022 | |
| EP | 3640521 | B1 | | 5/2023 | |
| KR | 20150105930 | A | * | 9/2015 | G05D 1/65 |
| KR | 1020150105930 | A | | 9/2015 | |

OTHER PUBLICATIONS

European Search Report issued on Mar. 21, 2025, for application No. EP24220243.0.

* cited by examiner

AUTONOMOUSLY MOVING TRANSPORT SYSTEM AND A METHOD FOR OPERATING SUCH AN AUTONOMOUSLY MOVING TRANSPORT SYSTEM

FIELD

The invention relates to an autonomously moving transport system, in particular for transporting goods, and to a method for operating such an autonomously moving transport system.

BACKGROUND

The autonomously moving transport system (AGV—automated guided vehicle) can, for example, be configured in the form of an autonomously moving lift truck, in particular in the form or a fork-lift truck for transporting pallets and/or pallet cages.

So that autonomously moving transport systems can reach their destination safely, they have environmental sensors that monitor protective fields in order, as a result, to be able to scan the environment for obstacles. These environmental sensors often lead to considerable losses in productivity since they are inflexible with respect to changed environmental conditions and thereby often lead to an emergency stop or to a slowed-down travel of the autonomously moving transport system. For example, the protective fields monitored by the environmental sensors do not allow a flexible and productive response to immobile objects, such as walls or dynamically changing environments. The switching of protective fields in dependence on the vehicle movement and the environment is cumbersome, inflexible and limited to the maximum number of protective field configurations.

SUMMARY

It is therefore the object of the present invention here to provide an autonomously moving transport system that moves efficiently through the environment without causing personal injury or damage to property in so doing.

The object is satisfied by an autonomously moving transport system configured to move the autonomously moving transport system along a travel route with a specific travel parameter, and by a corresponding method.

The autonomously moving transport system according to the invention, in particular for transporting goods, comprises a control apparatus, an obstacle recognition device and a drive unit. The drive unit is configured to move the autonomously moving transport system along a travel route with a specific travel parameter. The travel parameter is in particular a speed, a steering angle and/or an acceleration. The speed can in this respect be regulated both by at least one motor, such as an electric motor or an internal combustion engine, and by a braking system. The travel parameter can be selected differently for each position on the travel route. The obstacle recognition device is configured to detect an object in a monitored zone of the autonomously moving transport system and to transmit corresponding object information to the control apparatus that preferably comprises at least the position and optionally the speed and/or the direction of movement of the object. The monitored zone in this respect extends at least in the direction of travel so that at least objects that are located in front of the autonomously moving transport system in the direction of movement of the autonomously moving transport system are detected. The position of the object can be specified in absolute terms, for example by coordinates, in the object information, on the one hand, or in relative terms, for example with a distance and an angular position with respect to the autonomously moving transport system. The control apparatus is configured to divide the monitored zone into a travel corridor and at least one first secondary corridor. In this respect, the entire monitored zone or only one part of the monitored zone can be divided into the travel corridor and the at least one first secondary corridor. In this respect, the travel route itself runs through the travel corridor. The travel route is the planned route which the autonomously moving transport system will cover in the future. The control apparatus is configured to determine, based on the object information, whether the detected object is located in the travel corridor or in the at least one first secondary corridor. The control apparatus is further configured to adapt at least one travel parameter differently when the object is located in the first secondary corridor than when the object is located in the travel corridor.

It is particularly advantageous that the monitored zone is divided into a travel corridor and at least one first secondary corridor. Objects that are detected in the travel corridor pose a greater safety risk for the autonomously moving transport system than objects that are located in the first secondary corridor. If an object is detected in the travel corridor, the autonomously moving transport system can, for example, be stopped, whereas such a detected object in the first secondary corridor leads to no or only a reduced travel speed of the autonomously moving transport system. Overall, the autonomously moving transport system is thereby operated significantly more efficiently, wherein a high safety requirement is furthermore met. Instead of a "travel corridor", a "travel path" can also be spoken of.

In an advantageous embodiment, the width of the travel corridor is selected such that the autonomously moving transport system is always disposed within the travel corridor, even with any goods to be transported, in terms of its dimensions. The travel corridor is preferably more than 1 m or more than 2 m, but less than 2.50 m wider than the autonomously moving transport system.

In an advantageous embodiment, the at least one first secondary corridor is selected with respect to its arrangement relative to the travel corridor such that a stationary object within the first secondary corridor does not collide with the autonomously moving transport system that moves along its travel route.

In an advantageous embodiment, the control apparatus is configured to set the travel parameter in the case of a detected object in the travel corridor such that the autonomously moving transport system stops. It is also possible for the autonomously moving transport system to reduce its speed relative to a maximum permitted speed for the current position on the travel route or to travel at the maximum permitted speed for the current position on the travel route. A high safety standard is thereby achieved.

In an advantageous embodiment, the control apparatus is configured to determine, based on the object information, a distance of the object detected in the travel corridor from the autonomously moving transport system in order, in the event that the distance falls below a first distance value, to set the travel parameter such that the transport system stops and, in the event that the distance falls below the first distance value or a second distance value that is greater than the first distance value, to redefine the travel route and thus the travel corridor such that the detected object is no longer located in the new travel corridor. The distance of the object from the autonomously moving transport system can be determined for each part of the autonomously moving transport system, such as a front edge. The distance can also be determined towards the obstacle recognition device. It is particularly advantageous that, in the event that the detected object is still far away from the autonomously moving transport system, the route of the autonomously moving transport system is adapted accordingly at an early stage. A stopping and preferably also a speed reduction of the autonomously moving transport system thereby does not take place, whereby the efficiency is increased. If the travel corridor is redefined, this also applies to at least one first secondary corridor.

In an advantageous embodiment, the control apparatus is configured to communicate the new travel route to a higher-ranking guidance and/or control system.

In an advantageous embodiment, the control apparatus is configured to communicate detected objects and their determined object properties to a higher-ranking guidance and/or control system.

In an advantageous embodiment, the control apparatus is configured to communicate detected objects and their determined object properties to another autonomously moving transport system.

In an advantageous embodiment, the control apparatus is configured to receive objects and their object properties from a higher-ranking guidance and/or control system that were detected by another autonomously moving transport system. The autonomously moving transport system is then configured to adapt the travel parameter according to the received objects in addition to the associated object properties. The control apparatus is preferably configured to use received objects that are arranged in a stationary manner for longer for the determination of the current travel parameter than received objects that are moving.

In an advantageous embodiment, the control apparatus is configured to receive objects detected by another autonomously moving transport system in addition to their determined object properties.

In an advantageous embodiment, the control apparatus is configured to calculate the new travel route differently depending on the object information of the object detected in the travel corridor. If it is a large object and/or an object that is moving, in particular moving quickly, the new travel route runs further away from the old travel route, at least in the region of the object, than if the object is smaller and/or arranged in a stationary manner.

In an advantageous embodiment, the first secondary corridor directly adjoins the travel corridor towards the side of said travel corridor. The safety is thereby increased. The first secondary corridor can be just as wide as the travel corridor or narrower or wider. The first secondary corridor can extend as far or further or less far away from the autonomously moving transport system as/than the travel corridor.

In an advantageous embodiment, the main corridor and/or the at least one first secondary corridor can be defined as desired in their shape. The shape of the main corridor and/or of the at least one first secondary corridor only extends in the monitored zone of the obstacle recognition device. In one embodiment, the main corridor and/or the at least one first secondary corridor comprises/comprise at least one curved course.

In an advantageous embodiment, the first secondary corridor adjoins the travel corridor both directly at the left side of the travel corridor and directly at the right side of the travel corridor. The travel corridor is therefore surrounded at two sides by the first secondary corridor.

In an advantageous embodiment, the travel corridor and the first secondary corridor are only formed by a, for example manual or automatic, marking of certain regions in the monitored zone. The obstacle recognition device is configured to detect objects in the entire monitored zone. At least one part of the monitored zone or the entire monitored zone can be divided into the travel corridor and the first secondary corridor, in particular at the software side. Based on the object information, which includes, for example, the position of the object, the control apparatus or the obstacle recognition device is configured to determine whether the object is now located in a region within the monitored zone that is associated with the travel corridor or the at least one first secondary corridor.

In an advantageous embodiment, the control apparatus is configured to automatically define the travel corridor and the at least one first secondary corridor in dependence on the travel route in relation to the monitored zone.

In an advantageous embodiment, the object information is a position of the object in the monitored zone and/or a speed of the object and/or a direction of movement of the object. The position can in this respect be specified in absolute coordinates, such as Cartesian coordinates. However, the position can also be specified with polar coordinates in relation to the position of the autonomously moving transport system. The object information preferably includes the position, the speed and the direction of movement. That is, if the object moves away from the travel route, the travel parameter does not have to be adapted to the effect that the speed of the autonomously moving transport system is reduced.

In an advantageous embodiment, the control apparatus is configured to set the travel parameter based on the object information of an object detected in the first secondary corridor such that the autonomously moving transport system stops or reduces its speed relative to a maximum permitted speed for the current position on the travel route or travels at the maximum permitted speed for the current position on the travel route. The maximum permitted speed can also comprise the maximum speed of the autonomously moving transport system. In this case, the first secondary corridor is divided into three different regions. In a first region, which can also be designated as a stopping region, a stopping of the autonomously moving transport system takes place in dependence on the object information. This can, for example, take place if the object falls below a minimum distance from the autonomously moving transport system or moves in a direction and/or at a speed of movement that leads to a high risk of collision. In a second region, which can also be designated as an adaptive travel region, a constant change of the travel parameter, in particular of the speed at which the autonomously moving transport system travels, takes place in dependence on the continuously detected object information. In the adaptive travel region, the speed at which the autonomously moving transport system moves is greater than zero but less than a speed permitted for the current position on the travel route and/or less than the maximum speed of the autonomously moving transport system. In a third region, which can also be designated as a normal travel region, the autonomously moving transport system moves at the maximum permitted speed for the current position on the travel route. This maximum permitted speed can also comprise the maximum speed for the autonomously moving transport system. If an autonomously moving transport system can move at a maximum speed of 10 km/h and a maximum speed of 5 km/h is defined for a point on the travel route, the 5 km/h is the maximum permitted speed. If a maximum speed of 15 km/h is defined on the travel route, the autonomously moving transport system can move at a speed of 10 km/h, which is the maximum permitted speed in this case.

In an advantageous embodiment, the maximum permitted speed depends on the load of the autonomously moving transport system and/or on the type, such as the engine power or braking force, of the autonomously moving transport system.

In an advantageous embodiment, the control apparatus is configured to also select the travel parameter in dependence on the weight, in particular of the goods to be transported. A higher weight results in a longer braking distance so that the travel speed is reduced by the control apparatus.

In an advantageous embodiment, the obstacle recognition device is configured to continuously update the object information. The object information is in particular updated multiple times per second. The control apparatus is preferably likewise configured to continuously determine whether the detected object, with respect to its updated object properties, is located in the travel corridor or in the at least one first secondary corridor.

In an advantageous embodiment, the control apparatus, upon detection of an object in the first secondary corridor, is configured to set the travel parameter such that the travel speed of the autonomously moving transport system can be set in dependence on the distance of the detected object from the autonomously moving transport system; and/or in dependence on the speed of the detected object; and/or in dependence on the direction of movement of the detected object. It is thereby possible to react optimally to different risks.

In an advantageous embodiment, the travel speed of the autonomously moving transport system and the distance of the detected object; and/or the speed of the detected object; and/or the direction of movement of the detected object are linked to one another via a linear or non-linear function, in particular a quadratic or logarithmic function. A weighting is thereby possible.

In an advantageous embodiment, the control apparatus comprises a look-up table in which a travel parameter, in particular in the form of a speed, is stored for various object properties. The look-up table can be two-dimensional or multi-dimensional in this respect. In a two-dimensional look-up table, there is at least one travel parameter for a distance value. In a multidimensional look-up table, there is at least one travel parameter for a distance value and a speed and a direction of movement of the object. It is generally also conceivable that, instead of a look-up table, the corresponding at least one travel parameter is calculated using a mathematical function.

In an advantageous embodiment, the control apparatus, upon detection of an object in the first secondary corridor, is configured to set the travel parameter such that the travel speed of the autonomously moving transport system is higher with an increasing distance of the object from the autonomously moving transport system; and/or is lower with an increasing speed of the object in the direction of the travel route of the autonomously moving transport system; and/or is higher with an increasing speed of the object away from the travel route of the autonomously moving transport system. The relationship between the travel speed of the autonomously moving transport system and the distance of the object can be linear or non-linear. The same also applies to the speed and the direction of movement of the object. Due to such a differentiation with respect to the travel parameter of the autonomously moving transport system, the autonomously moving transport system is prevented from slowing down too much or stopping directly, whereby the transport performance would be less efficient overall.

In an advantageous embodiment, the control apparatus, upon detection of an object in the first secondary corridor, is configured in the event that:

a) a distance between the object and the autonomously moving transport system is smaller than a first distance value, to set the travel parameter such that the autonomously moving transport system stops;
b) a distance between the object and the autonomously moving transport system is greater than the first distance value and smaller than a second distance value, to set the travel parameter for the speed of the autonomously moving transport system in dependence on the distance, wherein the speed value is selected as greater as the distance increases. The speed value is greater than zero in this respect. However, the speed value is preferably smaller than the maximum permitted speed value for the current position on the travel route.
c) a distance between the object and the autonomously moving transport system is greater than the second distance value, to set the travel parameter for the speed of the autonomously moving transport system to a maximum permitted speed value for the current position on the travel route.

In this case, further regions can be drawn into the first secondary corridor to visualize the travel parameter in relation to the distance of the detected object. It is generally possible to also consider the speed and the direction of movement of the object in addition to the distance.

In an advantageous embodiment, the control apparatus is configured to also divide the monitored zone at least into a second secondary corridor, wherein the first secondary corridor is arranged between the travel corridor and the second secondary corridor. The control apparatus is further configured, on a detection of an object in the second secondary corridor that comprises the same distance from the autonomously moving transport system and/or the same speed and/or the same direction of movement as an object that is detected in the first secondary corridor, to adapt a travel parameter such that the speed at which the autonomously moving transport system moves is higher if such an object is detected in the second secondary corridor than if it is detected in the first secondary corridor. In other words, the autonomously moving transport system is thereby allowed a higher travel speed when an object is located in the second secondary corridor in relation to an object in the first secondary corridor, even though the distance from the autonomously moving transport system is identical or even though the speed and the direction of movement of the object are identical. In this respect, the second secondary corridor is spaced further away from the travel corridor than the first secondary corridor.

In an advantageous embodiment, the control apparatus assigns a lower risk of collision with the autonomously moving transport system to objects with the same object properties such as distance, speed and/or direction of movement in the second secondary corridor than to objects in the first secondary corridor that have the same distance, speed and/or direction of movement. As a result, in the case of such a detected object in the second secondary corridor, the control apparatus allows a higher speed at which the autonomously moving transport system moves along the travel route.

In an advantageous embodiment, the control apparatus is configured to adapt the travel parameter, in particular the speed, also in dependence on an intensity value of the obstacle recognition device and/or a noise of the obstacle recognition device and/or a reflector recognition of the obstacle recognition device and/or a fog recognition by the obstacle recognition device. The security is thereby increased further.

In an advantageous embodiment, the control apparatus is configured to transmit at least the travel corridor to the obstacle recognition device. The first secondary corridor is preferably also transmitted to the obstacle recognition device. The determination whether the detected object is located in the travel corridor or in the at least one first secondary corridor thereby takes place directly in the obstacle recognition device. The obstacle recognition device preferably only informs the control apparatus about a detected object when it poses a risk.

In an advantageous embodiment, the obstacle recognition device comprises at least one ToF sensor, one lidar sensor, one FMCW sensor, one 3D camera, one radar sensor and/or one ultrasonic sensor. Of course, a plurality of these sensors, also of different types, can also be part of the obstacle recognition device.

In an advantageous embodiment, the control apparatus is configured to graphically display the travel corridor, in addition to the travel route, and the at least one first secondary corridor on a display unit, in particular a screen unit. The screen unit can be arranged locally at the autonomously moving transport system or remotely therefrom, in particular in a higher-ranking guidance and/or control system.

In an advantageous embodiment, the monitored zone extends over more than 160°, 170° or more than 180° around the autonomously moving transport system. It is in particular 180°. Alternatively, it can also be 360°.

In an advantageous embodiment, the control apparatus is configured to adapt the travel parameter differently or to not adapt it if the detected object is another autonomously moving transport system.

The method according to the invention for operating an autonomously moving transport system, which in particular serves to transport goods and which comprises a control apparatus, an obstacle recognition device and a drive unit, has the following method steps. In a first method step, the autonomously moving transport system moves along a travel route with a specific travel parameter. In a second method step, an object is detected in a monitored zone of the autonomously moving transport system and corresponding object information, which preferably comprises at least the position of the object, is transmitted to the control apparatus. In a third method step, the monitored zone is divided into a travel corridor and at least one first secondary corridor, wherein the travel route runs through the travel corridor. Of course, this comprises that the third method step can also be carried out as a second or first method step. In a fourth method step, it is determined, based on the object information, whether the detected object is located in the travel corridor or in the at least one first secondary corridor. In a fifth method step, the travel parameter is adapted differently and indeed in dependence on whether the object is located in the first secondary corridor or in the travel corridor.

Some basic considerations relating to the autonomously moving transport system (AGV) are also set out below. The AGV in particular serves for collision avoidance in industrial environments based on the regulation of the travel speed, i.e. the travel parameter, of the AGV in dependence on the detected safe distance and safe speed of objects in the environment by means of a safety sensor, i.e. the obstacle recognition device.

Safety-technical requirements for such a system are a safety sensor (e.g. according to performance level d) for environmental detection (e.g. an optical laser scanner/lidar/3D camera or radar), a safety sensor/encoder for determining the vehicle speed, a safe control and a safe measurement data interface with a safe protocol between the safety sensors and the safe control. The safety sensor/encoder is part of the obstacle recognition device, wherein the safe control is part of the control apparatus. A reliable measurement data output for the laser scanner/lidar sensor can e.g. be realized in the form of a detected measurement uncertainty for each distance value or by means of checksums.

A further advantage of the AGV is a route planning and, if necessary, a localization of the AGV, which does not necessarily have to be regulated by a safe control, but can also be taken over by an unsafe control.

According to one example, the AGV travels at a constant speed, wherein a corresponding rigid protective field is permanently checked for intrusions/violations by the safety sensor for environmental detection depending on the travel speed, response time, braking distance, vehicle geometry and direction of travel. If an intrusion into the protective field is detected, i.e. an object is located in the protective field, the safe output (OSSD) is switched so that the AGV initiates an emergency stop (see FIG. 1). In special situations such as tight bends or an entry into a charging station, the active protective field is switched as a result of a simultaneously predefined AGV movement (e.g. travel speed adaptation).

Such protective fields are to be omitted here. The AGV should follow the travel route that is predefined (by the navigation control). The AGV safety system, i.e. the control apparatus, provides that the travel speed of the AGV is regulated by the safety controller in dependence on the safe distance and safe speed of the objects detected by the safety sensor. One can therefore speak of a regulated safe travel speed.

In particular, the AGV travel speed is to be regulated by the safety controller by means of a fixed correlation between detected distances and speeds of the objects. The regulation of the travel speed based on said correlation can therefore take place in a binary manner, maximum speed (third region) or stop (first region), and/or continuously (second region).

The correlation between the distance and the speed of the objects for regulating the travel speed can also be non-linear, e.g. quadratic, logarithmic, or without a mathematical correlation, but rather in any desired form.

The distance of the objects is predominantly the radial distance and the speed of the objects is predominantly the radial speed. The radial distance and speed can be determined predominantly with an FMCW lidar, preferably within one scan, or with a ToF lidar/3D camera, preferably within at least two scans/frames.

Alternatively to a radial measurement in relation to the sensor, the distance and speed of the objects can be determined in relation to one or more reference points, e.g. a vehicle edge of the AGV. In this case, the AGV geometry or collision-causing vehicle parts must preferably be configurable so that the corresponding reference points are considered by the safety controller, i.e. the control apparatus, when regulating the travel speed.

The measured distance and speed for regulating the travel speed of the AGV can relate to different detection variables:

1) Individual contour points: In the case of lidar, this would be each relevant beam or angular segment, wherein a pixel filtering of individual outliers can also take place.
2) Bundling or clustering of contour points to form larger contours, e.g. 5 contiguous contour points.
3) Objects consisting of many contour points: This would require a segmentation and/or recognition and/or classification of the contour points into individual objects.

To regulate the travel speed, the worst-case scenario is preferably considered in terms of safety, i.e. the minimum AGV travel speed resulting from the correlation between the measured distance and speed of the objects is regulated if many relevant objects are detected.

The regulation of the travel speed based on the detected distance and speed of the objects is preferably realized for the entire potential travel region in front of the AGV in the general case. In addition or as an alternative, the regulation can also take place for objects exclusively within a predefined monitored zone, such as the travel corridor of the AGV, similarly to a classic protective field. However, this monitored zone would not regulate a binary safe output, as would be the case for a classic protective field, but would only define the consideration of objects for the travel speed regulation. All other objects outside the monitored zone would then be ignored with respect to the regulation of the travel speed.

A plurality of monitored zones with different risks of danger for a collision would also be conceivable here, e.g. one monitored zone directly for the travel corridor of the AGV with a high risk of danger and a second monitored zone, i.e. the first secondary corridor, for the lateral region next to the AGV with a lower risk of danger. For the different monitored zones, different correlations, e.g. different gradients, between the detected distance and speed of the objects for regulating the travel speed can be defined in this case. Thus, for the second monitored zone, i.e. for the first secondary corridor, a greater travel speed would be regulated for a detected object with the same distance and speed as in the first monitored zone, i.e. for the travel corridor, since the risk of danger is lower. As described above, the decisive regulated travel speed for objects in the plurality of monitored zones would preferably be the worst-case and thus slowest resulting AGV travel speed.

The invention preferably results in the following advantages. Classic rigid protective fields as a safety function for AGV collision avoidance are no longer necessary. Static objects that project into a classic protective field, and would thus cause an OSSD switching, emergency stop or protective field switchover, only lead to a speed reduction or travel path adaptation of the AGV and would thereby significantly increase the productivity of the AGVs and significantly reduce the monitoring effort. Flexible travel routes of AGV fleets can be safeguarded since no discretization in the form of permanently taught-in protective fields is necessary. Compared to safe systems comprising a plurality of parallel unsafe lidar sensors that only provide measurement data, only one safety lidar sensor and one safe control are required. Costs and effort for sensor fusion can thereby be saved.

Further advantages are furthermore the correlation between the detected distance and speed of the objects for regulating the travel speed that can also be non-linear, e.g. quadratic, logarithmic, or without a mathematical correlation, but rather in any desired form. In addition to the variables distance and speed of the objects detected by the, in particular safe, obstacle recognition device, other variables can also be considered for the regulation of the travel speed, e.g. intensity, noise, reflector recognition, fog recognition. Overall, 3D lidar sensors comprising 3D data can also be used. Other fields of view, e.g. 360° instead of 180°, are also conceivable. Other safe sensors for environmental detection can also be used, such as: ToF (time of flight) lidar, FMCW (frequency modulated continuous wave)/coherent lidar, 3D camera (flash lidar), radar, ultrasound. The current travel corridor can also be forwarded from the safe AGV control, i.e. the control apparatus, to the lidar sensor, i.e. to the obstacle recognition device (bidirectional data transmission), to consider the current monitored zones. The safe measurement data output by the obstacle recognition device, in particular in the form of a laser scanner for environmental detection, can be used for further approaches for the route planning of the AGV control, e.g. the ray marching approach.

The invention will be described purely by way of example with reference to the drawings in the following. There are shown:

FIG. 1: an embodiment example of the autonomously moving transport system according to the invention;

FIG. 2: a monitored zone of the autonomously moving transport system according to the invention that is divided into a travel corridor and at least one first secondary corridor;

FIG. 3: a possibility of how a travel parameter of the autonomously moving transport system is adapted differently upon detection of different objects in at least one first secondary corridor;

FIG. 4: a monitored zone of the autonomously moving transport system according to the invention that is divided into a travel corridor, at least one first secondary corridor and one second secondary corridor; and FIG. 5 a flowchart that describes a method for operating the autonomously moving transport system.

FIG. 1 shows an embodiment example of an autonomously moving transport system 1 according to the invention that is configured in the form of a lift truck in this case. The autonomously moving transport system 1 serves to transport goods 2 that are e.g. arranged on pallets 3 and/or pallet cages. To pick up the pallets 3 and/or pallet cages, the lift truck 1 preferably comprises two forks 4.

The autonomously moving transport system 1 comprises a drive unit 5. It is preferably an electrical drive unit 5 that is, for example, supplied with electrical energy inductively (e.g. via at least one conductor path in the ground) or via a rechargeable battery. The drive unit 5 is configured to drive all the wheels 6 or only the front wheels or only the rear wheels of the autonomously moving transport system 1.

The autonomously moving transport system 1 furthermore comprises a control apparatus 7 and an obstacle recognition device 8. The obstacle recognition device 8 is configured to detect an object 10 in a monitored zone 9 of the autonomously moving transport system 1 and to transmit corresponding object information to the control apparatus 7.

FIG. 2 shows the monitored zone 9 of the autonomously moving transport system 1 according to the invention. In this embodiment example, the monitored zone 9 extends by 180° around the autonomously moving transport system 1 and faces with its center in the direction of travel of the autonomously moving transport system 1.

The drive unit 5 is configured to move the autonomously moving transport system 1 along a travel route 11 with a specific travel parameter.

The control apparatus 7 is configured to divide the monitored zone 9 into a travel corridor 12 and at least one first secondary corridor 13. The travel route 11 runs through the travel corridor 12.

The first secondary corridor 13 directly adjoins the travel corridor 12 at its left and right side.

In this embodiment example, the travel corridor 12 and the at least one first secondary corridor 13 do not extend over the entire length of the monitored zone 9 that is formed by the range of the obstacle recognition device 8. However, it would also be possible for the travel corridor 12 and/or the at least one first secondary corridor 13 to extend over the entire length of the monitored zone 9.

In this embodiment example, the monitored zone 9 is not completely divided into the travel corridor 12 and the at least one first secondary corridor 13 either. For example, there are regions of the monitored zone 9 that belong neither to the travel corridor 12 nor to the first secondary corridor 13. However, it would generally also be conceivable that the monitored zone 9 is completely divided into either the travel corridor 12 or the at least one first secondary corridor 13.

Five objects 10*a*, 10*b*, 10*c*, 10*d*, 10*e* are shown as examples in FIG. 2 that were detected at different positions in the monitored zone 9 by the obstacle recognition device 8.

The control apparatus 7 is configured to determine, based on the object information, whether the detected object 10*a*, 10*b*, 10*c*, 10*d*, 10*e* is located in the travel corridor 12 or in the at least one first secondary corridor 13. The object information is, for example, the position and/or the speed and/or the direction of movement of the object 10*a*, 10*b*, 10*c*, 10*d*, 10*e*.

BRIEF DESCRIPTION OF THE DRAWINGS

A first object 10*a* is arranged in the first secondary corridor 13 and moves at a certain speed, which is represented by the length of the arrow, in the direction of the travel route 11, wherein the direction of the first object 10*a* is represented by the direction of the arrow.

A second object 10*b* is arranged in a stationary manner in the first secondary corridor 13. It does not move.

Figure 1:
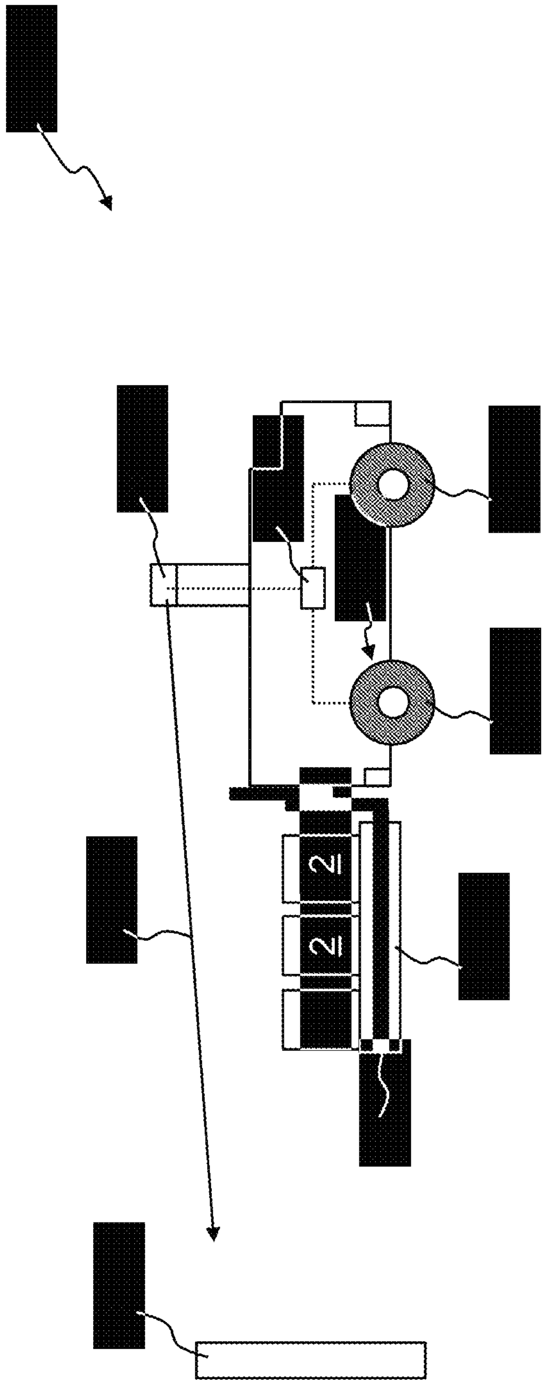

A third object 10*c* is arranged in the first secondary corridor 13 and moves away from the travel route 11 at a certain speed that is represented by the length of the arrow, wherein the direction of the third object 10*c* is represented by the direction of the arrow. In this case, the third object 10*c* moves more slowly than the first object 10*a*, which is symbolized by the length of the arrow.

A fourth object 10*d* is located in the travel corridor 12. It is arranged in a stationary manner.

A fifth object 10*e* is located outside the travel corridor 12 and outside the first secondary corridor 13. However, the fifth object 10*e* will be located in the travel corridor 12 at some point as the autonomously moving transport system 1 continues to move.

The control apparatus 7 is configured to adapt a travel parameter, such as the speed and/or a steering angle, differently when the object 10*a*, 10*b*, 10*c*, 10*d*, 10*e* is located in the first secondary corridor 13 than when the object 10*a*, 10*b*, 10*c*, 10*d*, 10*e* is located in the travel corridor 12.

DETAILED DESCRIPTION

On the detection of the first object 10*a* in at least one first secondary corridor 13, a stopping of the autonomously moving transport system 1 takes place since the first object 10*a* moves at a high speed in the direction of the autonomously moving transport system 1 and there is a risk of collision.

On the detection of the second object 10*b* in at least one first secondary corridor 13, a reduction of the speed of the autonomously moving transport system 1 takes place. However, the autonomously moving transport system 1 is not stopped.

On the detection of the third object 10*c* in at least one first secondary corridor 13, no reduction of the speed of the autonomously moving transport system 1 takes place since the third object 10*c* is located far enough away from the travel corridor 12 and furthermore moves away from the travel corridor 12.

On the detection of the fourth object 10*d* in the travel corridor 12, a stopping of the autonomously moving transport system 1 takes place since there is a risk of collision in the near future.

On the detection of the fifth object 10*e* in the monitored zone 9, which may be located in the travel corridor 12 in the future, a further definition of the travel route 11 and thus of the travel corridor 12 takes place, and indeed such that the fifth object 10*e* will not be located in the new travel corridor. The autonomously moving transport system 1 will drive around the fifth object 10*e* by means of a curve. Such an evasion is also possible if an object 10 is indeed located in the travel corridor 12, but the distance from the autonomously moving transport system 1 is sufficiently large, i.e. larger than a threshold value, to be able to safely perform an evasive maneuver.

Figure 3:
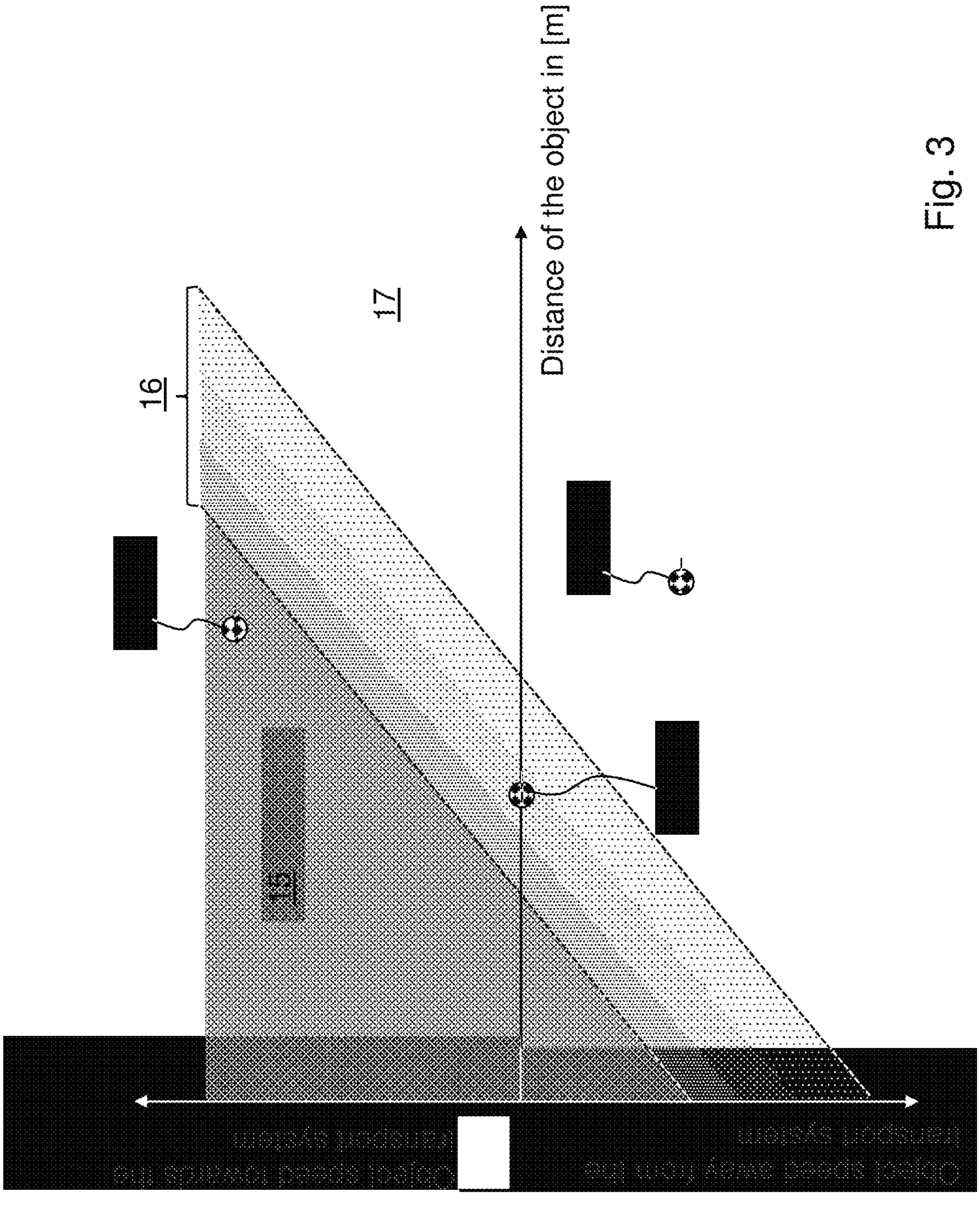

FIG. 3 describes a possibility of how a travel parameter of the autonomously moving transport system 1 is adapted differently, in particular adaptively, on the detection of different objects 10*a*, 10*b*, 10*c* in at least one first secondary corridor 13.

The control apparatus 7 is configured to set the travel parameter based on the object information of the object 10*a*, 10*b*, 10*c* detected in the first secondary corridor 13 such that the autonomously moving transport system 1 stops, or reduces its speed relative to a maximum permitted speed for the current position on the travel route 11, or travels at the maximum permitted speed for the current position on the travel route 11.

The measured object distance in meters (m) from the autonomously moving transport system 1 or the obstacle recognition device 8 is shown on the X axis. The hatching represents a travel parameter to be set for the autonomously moving transport system 1, in the form of the speed in m/s for the autonomously moving transport system 1. Regions with the same hatching cause the selection of the same travel parameter. Of course, the regions can be graded finer or coarser; i.e. there can be more or less hatching. Detected objects 10*a* that move in the direction of the autonomously moving transport system 1 are drawn in the region above the X axis. Detected objects 10*c* that move away from the autonomously moving transport system 1 are drawn in the region below the X axis. Objects 10*b* arranged in a stationary manner are drawn on the X axis.

Figure 2:
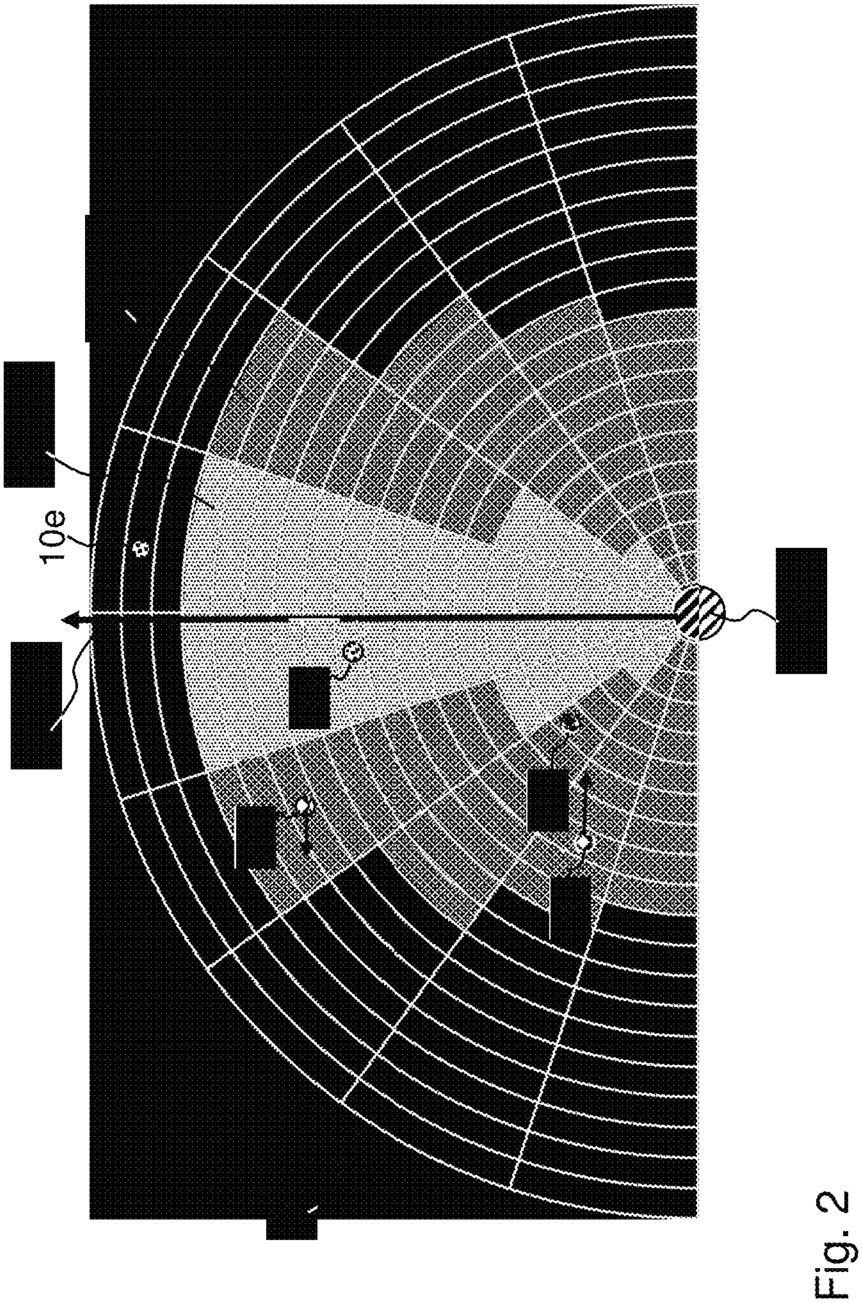

In this case, the first secondary corridor 13 is divided into three different regions 15, 16, 17. In a first region 15, which can also be designated as a stopping region, a stopping of the autonomously moving transport system 1 takes place in dependence on the object information, i.e. in particular the object speed and object distance. The first object 10*a* from FIG. 2 moves at a high speed in the direction of the autonomously moving transport system 1. For this reason, it is also drawn above the X axis. There is therefore a high risk of collision and the control apparatus 7 defines the travel parameters such that a stopping takes place. If the object 10 moves at a small distance from the autonomously moving transport system 1, away from the autonomously moving transport system 1, the speed of the object 10 must pass a limit of the object speed away from the transport system 1 (downwards in FIG. 3) so that no stopping of the autonomously moving transport system 1 is triggered.

In a second region 16, which can also be designated as an adaptive travel region, a constant change of the travel parameter, in particular of the speed at which the autonomously moving transport system 1 travels, takes place in dependence on the continuously detected object information. In the second region 16, the speed at which the autonomously moving transport system 1 moves is greater than zero but less than a speed permitted for the current position on the travel route 11 and/or less than the maximum speed of the autonomously moving transport system 1. The second object 10*b* from FIG. 2, which is arranged in a stationary manner, is drawn in this second region 16. Depending on the object information, i.e. depending on the position and/or speed of the second object 10*b*, a reduction of the travel speed of the autonomously moving transport system 1 takes place.

In a third region 17, which can also be designated as a normal travel region, the autonomously moving transport system 1 moves at the maximum permitted speed for the current position on the travel route 11. The third object 10*c* from FIG. 2, which moves away from the autonomously moving transport system 1 at a speed, is shown in this third region 17 below the X axis.

Figure 4:
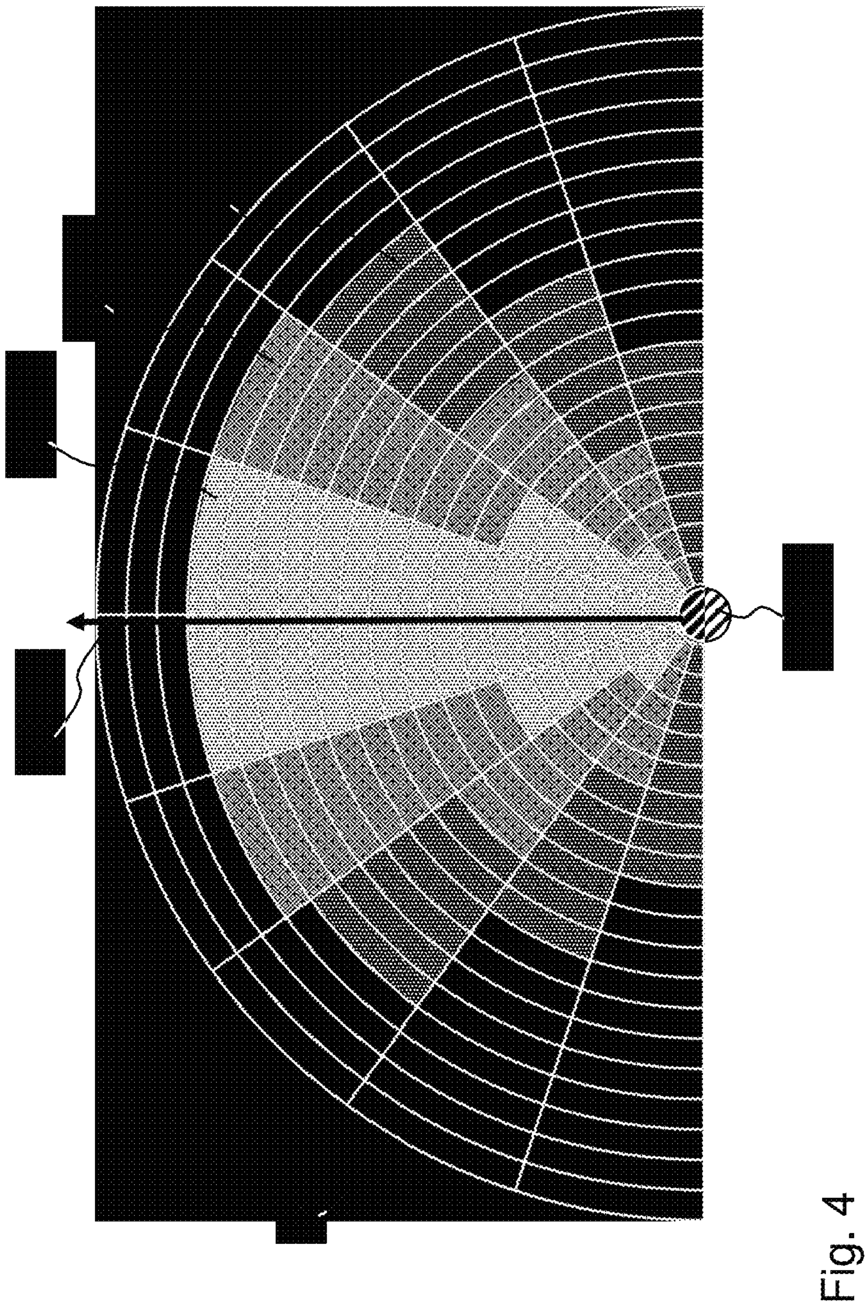

FIG. 4 shows a monitored zone 9 of the autonomously moving transport system 1 according to the invention that is divided into a travel corridor 12, at least one first secondary corridor 13 and one second secondary corridor 14. The first secondary corridor 13 is arranged between the travel corridor 12 and the second secondary corridor 14. The control apparatus 7 is configured, on a detection of an object 10 in the second secondary corridor 14 that comprises the same distance from the autonomously moving transport system 1 and/or the same speed and/or the same direction of movement as an object 10 that is detected in the first secondary corridor 13, to adapt a travel parameter such that the speed at which the autonomously moving transport system 1 moves is higher if such an object 10 is detected in the second secondary corridor 14 than if it is detected in the first secondary corridor 13.

The same statements as for the first secondary corridor 13 can apply to the second secondary corridor 14. Thus, the second secondary corridor 14 can also have a first region that can also be designated as a stopping region, a second region that can also be designated as an adaptive travel region, and a third region that can also be designated as a normal travel region.

Figure 5:
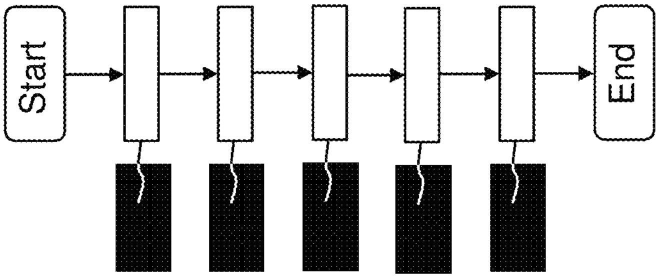

FIG. 5 shows a flowchart that describes a method according to the invention for operating the autonomously moving transport system 1. In a first method step S1, the autonomously moving transport system 1 moves along a travel route 11 with a specific travel parameter. In a second method step S2, an object 10 is detected in a monitored zone 9 of the autonomously moving transport system 1 and corresponding object information, which preferably at least comprises the position of the object 10, is transmitted to the control apparatus 7. In a third method step S3, the monitored zone 9 is divided into a travel corridor 12 and at least one first secondary corridor 13, wherein the travel route 11 runs through the travel corridor 12. An order with respect to the third method step S3 is not predefined. The third method step S3 can also be performed as the second or first method step S1, S2. In a fourth method step S4, it is determined based on the object information whether the detected object 10 is located in the travel corridor 12 or in the at least one first secondary corridor 13. In a fifth method step S5, the travel parameter is adapted differently, and indeed in dependence on whether the object 10 is located in the first secondary corridor 13 or in the travel corridor 12.

The invention is not restricted to the embodiment examples described. Within the scope of the invention, all the described and/or drawn features can be combined with one another in any desired manner.

REFERENCE NUMERAL LIST autonomously moving transport system 1
goods 2
pallet 3
forks 4
drive unit 5
wheels 6
control apparatus 7
obstacle recognition device 8
monitored zone 9
object 10, 10*a*, 10*b*, 10*c*, 10*d*, 10*e*
travel route 11
travel corridor 12
first secondary corridor 13
second secondary corridor 14
regions for the travel speed of the transport system of the secondary corridor 15, 16, 17
method steps S1, S2, S3, S4, S5

The invention claimed is:

1. An autonomously moving transport system, comprising a control apparatus, an obstacle recognition device and a drive unit, wherein the drive unit is configured to move the autonomously moving transport system along a travel route with a specific travel parameter, wherein the obstacle recognition device is configured to detect an object in a monitored zone of the autonomously moving transport system and to transmit corresponding object information to the control apparatus, wherein the control apparatus is configured to divide the monitored zone into a travel corridor and at least one first secondary corridor, wherein the travel route runs through the travel corridor, wherein the control apparatus is further configured to determine, based on the object information, whether the detected object is located in the travel corridor or in the at least one first secondary corridor, and wherein the control apparatus is configured to adapt a travel parameter differently when the object is located in the first secondary corridor than when the object is located in the travel corridor, and, wherein the control apparatus is configured to determine, based on the object information, a distance of the object detected in the travel corridor from the autonomously moving transport system in order, in the event that the distance falls below a first distance value, to set the travel parameter such that the transport system stops and, in the event that the distance falls below a second distance value that is greater than the first distance value, to redefine the travel route and thus the travel corridor such that the detected object is no longer located in the new travel corridor.

2. The autonomously moving transport system according to claim 1, wherein the transport system is configured to transport goods.

3. The autonomously moving transport system according to claim 1, wherein the control apparatus is configured to set the travel parameter in the case of a detected object in the travel corridor such that the transport system:

a) stops; and/or b) reduces its speed relative to a maximum permitted speed for the current position on the travel route; and/or c) travels at the maximum permitted speed for the current position on the travel route.

4. The autonomously moving transport system according to claim 1, wherein the first secondary corridor directly adjoins the travel corridor towards the side of said travel corridor.

5. The autonomously moving transport system according to claim 4, wherein the first secondary corridor directly adjoins the travel corridor at the left side thereof and wherein the first secondary corridor directly adjoins the travel corridor at the right side thereof.

6. The autonomously moving transport system according to claim 1, wherein the object information is:

a) a position of the object in the monitored zone; and/or b) a speed of the object; and/or c) a direction of movement of the object.

7. The autonomously moving transport system according to claim 1, wherein the control apparatus is configured to set the travel parameter based on the object information of an object detected in the first secondary corridor such that the autonomously moving transport system:

a) stops; and/or b) reduces its speed relative to a maximum permitted speed for the current position on the travel route; and/or c) travels at the maximum permitted speed for the current position on the travel route.

8. The autonomously moving transport system according to claim 1, wherein the control apparatus, upon detection of an object in the first secondary corridor, is configured to set the travel parameter such that the travel speed of the autonomously moving transport system can be set in dependence on:

a) the distance of the detected object from the autonomously moving transport system; and/or b) the speed of the detected object; and/or c) the direction of movement of the detected object.

9. The autonomously moving transport system according to claim 8, wherein the travel speed of the autonomously moving transport system and:

a) the distance of the detected object; and/or b) the speed of the detected object; and/or c) the direction of movement of the detected objects are linked to one another a linear or non-linear function.

10. The autonomously moving transport system according to claim 9, wherein the linear or non-linear function is a quadratic or logarithmic function.

11. The autonomously moving transport system according to claim 1, wherein the control apparatus, upon detection of an object in the first secondary corridor, is configured to set the travel parameter such that the travel speed of the autonomously moving transport system:

a) is higher with an increasing distance of the object from the autonomously moving transport system; and/or b) is lower with an increasing speed of the object in the direction of the travel route of the autonomously moving transport system; and/or c) is higher with an increasing speed of the object away from the travel route of the autonomously moving transport system.

12. The autonomously moving transport system according to claim 1, wherein the control apparatus, upon detection of an object in the first secondary corridor, is configured in the event that:

a) a distance between the object and the autonomously moving transport system is smaller than a first distance value, to set the travel parameter such that the autonomously moving transport system stops; and/or b) a distance between the object and the autonomously moving transport system is greater than the first distance value and smaller than a second distance value, to set the travel parameter for the speed of the autonomously moving transport system in dependence on the distance, wherein the speed value is selected as greater as the distance increases; and/or c) a distance between the object and the autonomously moving transport system is greater than the second distance value, to set the travel parameter for the speed of the autonomously moving transport system to a maximum permitted speed value for the current position on the travel route.

13. The autonomously moving transport system according to claim 1, wherein the control apparatus is configured to also divide the monitored zone at least into a second secondary corridor, wherein the first secondary corridor is arranged between the travel corridor and the second secondary corridor, and wherein the control apparatus is configured, on a detection of an object in the second secondary corridor that comprises the same distance from the autonomously moving transport system and/or the same speed and/or the same direction of movement as an object that is detected in the first secondary corridor, to adapt a travel parameter such that the speed at which the autonomously moving transport system moves is higher if such an object is detected in the second secondary corridor than if it is detected in the first secondary corridor.

14. The autonomously moving transport system according to claim 1, wherein the control apparatus is configured to adapt the travel parameter also in dependence on an intensity value of the obstacle recognition device and/or a noise of the obstacle recognition device and/or a reflector recognition of the obstacle recognition device and/or a fog recognition by the obstacle recognition device.

15. The autonomously moving transport system according to claim 14, wherein the travel parameter is a speed.

16. The autonomously moving transport system according to claim 1, wherein the control apparatus is configured to transmit at least the travel corridor to the obstacle recognition device.

17. The autonomously moving transport system according to claim 1, wherein the obstacle recognition device comprises at least one ToF sensor, one lidar sensor, one FMCW sensor, one 3D camera, one radar sensor and/or one ultrasonic sensor.

18. A method for operating an autonomously moving transport system, comprising a control apparatus, an obstacle recognition device and a drive unit, having the following method steps:

a) moving the autonomously moving transport system along a travel route with a specific travel parameter;

b) detecting an object in a monitored zone of the autonomously moving transport system and transmitting object information to the control apparatus;

c) dividing the monitored zone into a travel corridor and at least one first secondary corridor, wherein the travel route runs through the travel corridor;

d) determining, based on the object information, whether the detected object is located in the travel corridor or in the at least one first secondary corridor; and e) adapting the travel parameter differently depending on whether the object is located in the first secondary corridor or in the travel corridor, wherein the control apparatus is configured to determine, based on the object information, a distance of the object detected in the travel corridor from the autonomously moving transport system in order, in the event that the distance falls below a first distance value, to set the travel parameter such that the transport system stops and, in the event that the distance falls below a second distance value that is greater than the first distance value, to redefine the travel route and thus the travel corridor such that the detected object is no longer located in the new travel corridor.

* * * * *